United States Patent
Yang (10) Patent No.: US 8,130,766 B2
(45) Date of Patent: Mar. 6, 2012

(54) SYSTEM AND METHOD FOR IMPLEMENTING MULTIMEDIA CALLS ACROSS A PRIVATE NETWORK BOUNDARY

(75) Inventor: Zhengrong Yang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 1320 days.

(21) Appl. No.: 10/565,651

(22) PCT Filed: Dec. 26, 2003

(86) PCT No.: PCT/CN03/01126
§ 371 (c)(1),
(2), (4) Date: Aug. 30, 2006

(87) PCT Pub. No.: WO2005/011216
PCT Pub. Date: Feb. 3, 2005

(65) Prior Publication Data
US 2007/0140267 A1    Jun. 21, 2007

(30) Foreign Application Priority Data
Jul. 25, 2003    (CN) .................................. 03 1 39934

(51) Int. Cl.
*H04L 12/28* (2006.01)
(52) U.S. Cl. ........ 370/401; 370/352; 370/353; 370/354; 370/341; 370/431
(58) Field of Classification Search .................. 370/401; 709/226, 238, 249, 245
See application file for complete search history.

(56) References Cited

U.S. PATENT DOCUMENTS

| | | | |
|---|---|---|---|
| 6,523,068 B1 * | 2/2003 | Beser et al. .................... | 709/238 |
| 6,618,757 B1 * | 9/2003 | Babbitt et al. ................ | 709/226 |
| 6,674,758 B2 * | 1/2004 | Watson .......................... | 370/401 |
| 7,107,360 B1 * | 9/2006 | Phadnis et al. ................ | 709/250 |
| 7,146,410 B1 * | 12/2006 | Akman .......................... | 709/220 |
| 2002/0150083 A1 | 10/2002 | Fangman et al. | |

(Continued)

OTHER PUBLICATIONS

Abstract not available of CN 148088; Abstract of corresponding document EP 1130846, data supplied from the esp@cenet database—Worldwide.

*Primary Examiner* — Joseph J Nguyen
(74) *Attorney, Agent, or Firm* — Michael Best & Friedrich LLP (57) ABSTRACT

A system and method of the present invention for implementing multimedia calls across a private network boundary is provided, the system comprising a public network and at least one private network, and at least the following hardware components: at least one media gateway for connecting with multimedia terminals of various protocols; at least one boundary gateway for connecting the private network and the public network and performing the translation of a private network address and a public network address between each other, wherein each boundary gateway is provide with an unique subnetwork ID to correspond to the private network connected therewith; a call controller for establishing calls and controlling service logics, in which is recorded the correspondence relationship information of all said boundary gateways and the subnetwork IDs; wherein, the call controller processes a call concerning a private network according to the subnetwork ID information. The system and method of the present invention is simple to implement, has high efficiency and wide application range; saves the boundary gateway resources, does not modify the signaling content and retain its integrity; is applicable to the media gateways of various protocols, and has a high adaptability.

19 Claims, 4 Drawing Sheets

U.S. PATENT DOCUMENTS

| | | |
|---|---|---|
| 2003/0033418 A1 | 2/2003 | Yong et al. |
| 2003/0093563 A1 | 5/2003 | Yong et al. |
| 2003/0115307 A1* | 6/2003 | Brissette ........................ 709/223 |
| 2004/0028035 A1* | 2/2004 | Read ............................. 370/352 |
| 2004/0095944 A1* | 5/2004 | Mitchell ........................ 370/401 |
| 2004/0139227 A1* | 7/2004 | Takeda .......................... 709/245 |
| 2004/0148439 A1* | 7/2004 | Harvey et al. ................. 709/249 |
| 2004/0249974 A1* | 12/2004 | Alkhatib et al. .............. 709/245 |

* cited by examiner

SYSTEM AND METHOD FOR IMPLEMENTING MULTIMEDIA CALLS ACROSS A PRIVATE NETWORK BOUNDARY

This application is a National Stage application of co-pending PCT application PCT/CN2003/001126 filed Dec. 26, 2003, which was published in Chinese under PCT Article 21(2) on Feb. 3, 2005, which claims priority from Chinese patent application 03139934.7 filed on Jul. 25, 2003. These applications are incorporated herein by reference in their entirety.

FIELD OF THE INVENTION

The present invention relates to a system and method supporting the implementation of multimedia calls across a private network boundary, which mainly relate to the field of implementing voice, video, data and their combination calls in the Internet, and can support the multimedia intercommunication of voice, video and data, etc. between the multimedia terminals or media gateways in different private networks, or between a multimedia terminal or media gateway in a private network and that in a public network.

BACKGROUND OF THE INVENTION

In the current technical evolvement towards the NGN (Next Generation Network) technology, it is already possible to realize the communication of multimedia information such as voice, video, etc. over a packet network such as an IP network or a traditional telephone switching network such as a PSTN by various means such as Softswitch, H.323, etc.

Especially in a packet network such as an IP network, due to there being various networking methods such as WAN, LAN etc., in implementing the intercommunication of multimedia information, the situation where devices such as media gateways and IP telephones in a public network and a private network or in private networks intercommunicate will occur.

Since a private network address cannot be used in a public network, how to translate a private network address into a public network address, and how to find the public network address of the destination and the corresponding private network address is the key to solve this problem.

In the existing IP technology, a common method is to use the NAT (Network Address Translation) protocol. The NAT protocol can associate the private network address of a device in each private network with a corresponding public network address in advance, and when the device needs to communicate with a device such as a media gateway or IP telephone in another network, all the IP packets containing the signaling traffic and media traffic messages sent out will have the private network address replaced by the corresponding public network address using the NAT protocol in a special device and then be forwarded. Because on both the calling and called sides, the address has been translated into the public network address using the NAT protocol, any existing mature routing protocol can be used to find the called side, realizing the voice, video communication. The biggest advantage of this method is its simpleness, but its shortcomings are also especially obvious:

A big reason for using private network addresses is the shortage of public network address resources; while in view of the characteristics of implementing a packet-based (e.g., IP) voice, video and other calling service, adopting the NAT method will consume a large amount of address resources. This is because, firstly, each device will be pre-allocated a public network address to associate with a private network address; when this device is not online at all, this association still exists, and cannot be allocated dynamically. Secondly, a device such as a media gateway or IP telephone needs a port for call signaling exchanges during call establishment, and once the call is established, it needs other ports for the transmission of media traffic such as voice, video, etc; using the NAT protocol, one can only establish in advance the associations between these private network ports and the corresponding addresses and ports of the public network. Accordingly, even when the device such as a media gateway or IP telephone etc is not in use, these ports for media traffic must remain associated, thus wasting the address resources.

In the message exchanges between devices such as media gateways or IP telephones etc. and their call controllers (e.g., a Softswitch, a GateKeeper in H.323, etc.), various signaling protocols, such as H.248, MGCP, SIP, H.323, etc., are widely used, which carry the address information of the media traffic of the calling and called sides in the capability negotiation. Whereas the NAT protocol can only translate an address in an IP packet header, and does not intervene in the content of the protocol payload in the IP packet, therefore these addresses of the media traffic (which are still private network addresses) cannot be translated; consequently, the media traffic will not be conveyed and thus fail. This is the most essential weakness of using the NAT scheme.

To address the above shortcomings of the NAT scheme, now there also appeared other improved solutions, such as the protocol analysis gateway:

A device such as a media gateway or IP telephone etc. in a private network does not send signaling messages directly to a call controller (e.g. a Softswitch, GateKeeper, etc.), but first sends these messages to a protocol analysis gateway, which can associate them to a public network address according to their private network address statically or dynamically, and then forward them the call controller (a Softswitch, GateKeeper, etc.). Similarly, the media traffic is also associated to a public network address dynamically, thus realizing the exchange of the media traffic.

The biggest advantage of this scheme is that the protocol analysis gateway not only translates between a public network address and a private network address, but also, for each protocol, translates the private network address relating to the media traffic in the protocol into a public network address. For example, for a H.248, MGCP, or SIP protocol, the SDP therein can be analyzed, and the private network address therein can be extracted and replaced.

This scheme, however, has its own disadvantages:

Since a device such as a media gateway or IP telephone in a private network does not send commands directly to the call controller, the realization of some functions (e.g., switching, access authentication, and mobility etc.) may be affected; and at the same time, for such a call controller, it manages the public network address to which a protocol analysis gateway corresponds, but cannot manage a device such as a media gateway or IP telephone etc. in an actual private network, which may also affect the realization of some functions (e.g., network topology, location, etc.).

Since a device such as a media gateway or IP telephone etc. in a private network does not send commands directly to the call controller, when moved into another private network, it will find difficulty in collaborating with the new protocol analysis gateway.

This scheme affects the integrity of the IP packet payloads by engaging in analyzing and changing the signaling contents. In particular, if these IP packets use security features, such as encryption, the address replacement may not be able to be realized at all.

This scheme requires each protocol to have its own protocol analysis gateway, and with the number of protocols used by the devices such as media gateways or IP telephones etc. in a private network increasing, the number of protocol analysis gateways also increases.

The consequence of this scheme is that even the call from a device in the same private network will be forwarded via the protocol analysis gateway, as a result, on the one hand, the forwarding of the media traffic increases the processing volume of the protocol analysis gateway; on the other hand, the voice quality of the device will be affected.

To search for relevant existing patents, we queried in the web page of the State Intellectual Property Office of the P.R.C. with "IP" as the keyword, and found on relevant patent document (by 2003/Mar./24).

Using "private network" as the keyword in the abstract field to retrieve abstracts, there was a relevant patent:

An invention patent application, Chinese Patent Application No. 01135610.3 (Publication No. CN 1411220A), entitled "Method and system for implementing the IP voice service in a private network".

This patent application, submitted by Huawei Technologies, describes a method that when a terminal in a private network registers with a VoIP server, translating the private network addresses of all the signaling channels and media channels required by the calls into the corresponding public network addresses using the NAT protocol, and maintaining the possession of these channels all the time.

It is essentially different from the present invention in the implementation concept.

1) It belongs to the NAT implementation method, whose advantages and disadvantages can be seen in the above description of the background technology, and when using the technique of this patent application, there is the disadvantage of possessing a large amount of NAT public network addresses even when no call is made and thus wasting resources. Therefore, this method can have much fewer connected users than the present invention with the same address translation capability. In other words, its efficiency is not high.

2) To remedy the shortcoming that in the NAT protocol only an IP address and not the signaling content can be modified, the technique of this patent application extends the standard VoIP protocols (by which is meant the MGCP protocol in the patent application), making "the VoIP server send the public network address and port number of the corresponding logic channel to a PC client in the response message to a login request of the PC client of a private network user. This belongs to the modification of a standard protocol, the starting point of which is vastly different from the present invention.

3) According to this patent application, even the voice communication between users in the same private network must goes around through the public network, which will increase the voice delay, causing the degradation of the voice quality, and lower the security of the internal communication.

4) In this patent application, there is no description of the case where a private network is nested within another private network, but judging from what its content relates to, it is possible to realized a private network being nested within another private network, but many important links, such as the coupling of the address proxy server and the VoIP, the workings of the gateway, etc., need to be described and disclosed explicitly.

Querying at http://www.uspto.gov by using keywords ((("PRIVATE NETWORK" OR NAT) AND "IP ADDRESS") AND TELECOMMUNICATION), about 93 patents (by 2003/Mar./24) could be found, the majority of which are irrelevant to the present invention, and the relevant patents are as follows:

U.S. Pat. No. 6,526,056, entitled "Virtual private network employing tag-implemented egress-channel selection".

This patent, submitted by CISCO, identifies different VPNs (Virtual Private Network) with TAGs; it encapsulates a TAG according to the destination VPN at an edge router of a VPN (this TAG was negotiated by two VPN edge routers), and then achieves the objective of crossing a private network boundary by adding the TAG at the sending side when sending the data and removing the TAG at the receiving side. It is relevant to but not in conflict with the present invention. Since it uses edge routers to negotiate and determine the TAG values, without a call controller to coordinate and manage the TAG values in the entire domain, it does not constitute a system for implementing multimedia calls across a private network boundary, and will face difficulties in particular when implementing a complex networking method (e.g., the case where a private network is nested within another private network) for multimedia calls. What this U.S. patent describes is equivalent to a method implemented by the boundary gateway (BGW) of the present invention.

U.S. Pat. No. 6,523,068, entitled "Method for encapsulating and transmitting a message includes private and forwarding network addresses with payload to an end of a tunneling association".

This patent, submitted by 3Com, is used for packaging a packet before it is sent from a private network, and then sending it through a tunnel; and identifying the packet after receiving it in a public network. The concept of this patent is related to an implementation method of the system presented by the present invention, and similar to the above patent, it describes specifically a method for sending a packet from a private network to a public network, and not the whole system. This is where it differs from the present invention, which describes a system that, in addition to this aspect, further has other aspects concerning how to establish a connection between private networks in order to make multimedia calls.

U.S. Pat. No. 6,496,867, entitled "System and method to negotiate private network addresses for initiating tunneling associations through private and/or public networks".

It is also submitted by 3Com, and similar to the U.S. Pat. No. 6,523,068, presents a system and method for establishing a tunnel between a public network and a private network—it negotiates the public network addresses of the source and destination private network devices through a third party device and edge devices. It is closest to the system described in the present invention, both of them crossing a private network boundary through tunneling, but the core ideas in their implementation are quite different.

1) In this patent, the role of the third party device is only to obtain the public network address of the destination, and it only negotiates the IP addresses of the source and destination edge devices in the same network, that is, it is segment-to-segment; while the present invention aims to be end-to-end, which is much simpler in terms of device usage and technical complexity. In multimedia calls, such a method of segment-to-segment public network address negotiation will make the call control method complicated and dispersed, and difficult to realize some service logics.

2) In this patent, what is described throughout is the cross-private network boundary communication between two different subnetworks in a public network, wherein the source end edge device (equivalent to the boundary gateway in the present invention) stores the address tables of the private network addresses of source end devices, the public network addresses of destination end edge devices, and the private network addresses of destination end devices, whereby the routing is determined. If it is the case where a private network is nested within another private network, then inferring from its discussion, since the source end edge device cannot obtain directly the private network address of the destination end device (because there are multiple private networks in between and there are multiple edge devices), finding the routing by using the method of this patent will fail, unless it adds more identifiers to identify this tunnel. The present invention, since using other methods, has no such problem, and can realize the networking situation where a private network is nested within another private network.

3) In this patent, the core of its method is to hope the communication between the source end device and the destination end device is like that within the same network. Therefore, it dynamizes the IP address allocation of the source and destination end devices, and then, when initiating the communication, by means of transferring the private network addresses or selecting from multiple private network addresses, selects the private network addresses of the source and destination end as the IP addresses of the same network, and at the same time ensures that these addresses do not duplicate in their respective networks. Thus, when data traffic of either end is sent to the opposite end, it will be transferred first to the corresponding edge device (because the destination address is not in the same private network), and then through the corresponding address table inside the edge device, the edge device of the opposite end is found, and then the device of the opposite end is found, thus completing the data exchange. The benefits are obvious, but the biggest problem is that, since the transfer of the private network addresses affected the IP address allocation plan of the devices in the destination private network, some services of the devices in the destination private network unrelated to the communication with the source end devices may be affected to not function normally; since the IP address has been allocated as an address in the same network of the source side, if at the same time the service needs to browse the Web, it may for the reason of the IP address, for the service is one unrelated to the source end. Secondly, since private network addresses are to be transferred, the private network addresses of the source and destination end must be planned as in the same network, even when they are not in communication. This is feasible for some applications (e.g., the communication between a company headquarters and its branches in various regions), but for the communication between different companies, even between different operators, this requirement is too demanding. Thirdly, the transfer of private network addresses may bring security threats to the destination end devices. In contrast, the present invention has no requirement on IP address planning, and will not damage the IP address plan of the destination end; therefore its applicable range is much wider than this patent.

U.S. Pat. No. 6,006,272, entitled "Method for network address translation".

What it presents is that: devices in each private network need to be configured with a private network address, the corresponding public network address, and a MAC address; a router determines whether it is a public network or a private network based on the destination address, and then performs address translation. This patent only relates to the NAT, and is similar to the NAT translation as described above, whose advantages and disadvantages have also been described above.

In the foregoing, the technical characteristics and deficiencies of various prior art solutions have been described in detail, and it is obvious the prior art techniques need to be improved.

SUMMARY OF THE INVENTION

The object of the present invention is to provide a system and method for implementing multimedia calls across a private network boundary wherein by configuring in the hardware system at least one boundary gateway across a boundary, a call controller for global control, and at least one media gateway, connecting multiple media terminals of different types with the boundary gateways, the boundary gateways receiving control from the call controller, and under the control of the call controller, establishing a signaling message tunnel and media channel between different private networks or between a private network and a public network through the boundary gateways, the shortcomings of the above mentioned schemes are overcome, and not only the communication across a private network boundary are supported, but also it is possible to leave the signaling content intact, thus guaranteeing the integrity of the IP packet payloads sent from a private network.

Further, the object of the present invention is to provide a system and method for implementing multimedia calls across a private network boundary wherein due to the unified control of the call controller, the media traffic between the media gateways within the same subnetwork is transferred directly between the two media gateways via a reachable route, without needing to be forwarded by a boundary gateway or another device.

Still further, the object of the present invention is to provide a system and method for implementing multimedia calls across a private network boundary wherein because in an environment where a private network is nested within another private network, a signaling message tunnel or media channel can be established from an external network such as another private network or a public network to an internal private network through multiple boundary gateways including an intermediary boundary gateway(s) under the control of the call controller, the data transmission under more complex network architecture can be realized.

The technical solution of the present invention is as follows:

According to an aspect of the present invention, there is provided a system for implementing multimedia calls across a private network boundary, comprising a public network, at least one private network, and: at least one media gateway for connecting multimedia terminals of various protocols; at least one boundary gateway for connecting the private network and the public network and performing the translation between a private network address and a public network address, wherein each boundary gateway is provide with an unique subnetwork ID to correspond to the private network connected therewith; a call controller for establishing calls and controlling business logics, in which is recorded the correspondence relationship information of all said boundary gateways and subnetwork IDs; wherein, the call controller processes the calls concerning private networks according to the subnetwork ID information.

Preferably, the media gateway functions as an access point of multimedia services for the multimedia terminals connected therewith, assembling the signaling message from the multimedia terminal to the call controller into a standard signaling message according to the respective protocol requirements, but not changing the content of the signaling message, and sending it to the boundary gateway connected with the media gateway.

Preferably, the boundary gateway functions to receive the signaling message from a media gateway connected therewith, establish a signaling tunnel from the boundary gateway to the call controller according to its own subnetwork ID, send the signaling message to the call controller through the signaling tunnel, and when the media gateway initiates the call, establish automatically a media channel to the called side boundary gateway according to the subnetwork ID of the called side boundary network to transmit the media traffic.

Preferably, the call controller receives the signaling message from the boundary gateway, returns a response message to the media gateway having sent the signaling message according to the subnetwork ID of the boundary gateway, establishes a signaling tunnel to the called side boundary gateway according to the subnetwork ID of the called side boundary gateway, and when the call is initiated, controls the establishment of a media channel according to the subnetwork IDs of the calling side boundary gateway and called side boundary gateway.

Preferably, within a private network of the system other private networks can be nested; the system further comprises internal boundary gateways for connecting the private network and the nested private networks of the private network, wherein each internal boundary gateway is provided with an unique subnetwork ID to correspond to the private network connected therewith; the internal boundary gateway receives the signaling message from a media gateway connected therewith, establishes a signaling tunnel from the boundary gateway through an intermediary boundary gateway(s) to the call controller according to its own subnetwork ID, sends the signaling message to the call controller through the signaling tunnel, and when the media gateway initiates the call, establishes automatically a media channel through the intermediary boundary gateway(s) to the called side boundary gateway according to the subnetwork ID of the called side boundary network to transmit the media traffic.

Preferably, each of the private networks is provided with an unique subnetwork ID.

Preferably, the subnetwork ID of each of the boundary gateways is identical with the subnetwork ID of the private network to which it belongs; the subnetwork ID of each of the internal boundary gateways is identical with the subnetwork ID of the private network to which it belongs.

According to another aspect of the present invention, there is provided a method for implementing multimedia calls in a system comprising a public network and a private network, the system comprising: at least one media gateway for connecting multimedia terminals of various protocols; at least one boundary gateway for connecting the private network and the public network and performing the translation between a private network address and a public network address; a call controller for establishing calls and controlling business logics, in which is recorded the correspondence relationship information of all said boundary gateways and subnetwork IDs; the method comprising: allocating an unique subnetwork ID to each boundary gateway to correspond to the private network connected therewith; processing a multimedia call according to the subnetwork ID of the boundary gateway.

Preferably, the step of allocating an unique subnetwork ID to each boundary gateway further comprises: numbering the subnetworks where all the media gateways in the domain that the call controller can control reside, and allocating subnetwork IDs unique in the entire domain to them respectively; providing all the boundary gateways with their unique subnetwork IDs, the subnetwork IDs of the boundary gateways being identical with the IDs of the subnetworks connected with them, and using the call controller as the signaling receiver of the boundary gateways.

Preferably, the step of processing a multimedia call according to the subnetwork ID of the boundary gateway further comprises: the media gateway sending the signaling message of the multimedia terminal to the call controller to the boundary gateway connected with the media gateway; upon receiving the signaling message, the boundary gateway establishing a signaling tunnel from the boundary gateway to the call controller according to its own subnetwork ID, and sending the signaling message to the call controller through the signaling tunnel; the call controller receiving the signaling message from the boundary gateway, and returning a response message to the media gateway having sent the signaling message according to the subnetwork ID of the boundary gateway.

Preferably, the step of sending the signaling message to the boundary gateway by the media gateway further comprises: the media gateway assembling the signaling message into a standard signaling message according to the respective protocol requirements, and then sending it to the boundary gateway connected with the media gateway.

Preferably, the step of establishing a signaling tunnel from the boundary gateway to the call controller further comprises: the boundary gateway determining whether the boundary gateway and the call controller are in the same subnetwork according to the subnetwork ID, and if so, the boundary gateway sending the signaling message directly to the call controller, otherwise, the boundary gateway establishing a signaling tunnel through an intermediary boundary gateway(s) to the call controller, and the boundary sending the signaling message to the call controller through the signaling tunnel.

Preferably, the signaling tunnel will remain permanently after being established, and be maintained all the time by the boundary gateway for the subsequent signaling exchanges between the connected media gateways and the call controller.

Preferably, the method further comprises: when the media gateway initiates the call, establishing a signaling tunnel from the call controller to the called side boundary gateway; the step of establishing a signaling tunnel from the call controller to the called side boundary gateway further comprising: the media gateway initiating the call, sending the call number to the call controller; the call controller receiving the call number and then analyzing the call number, and sending a signaling request to the called side boundary gateway; the call controller determining whether the called side boundary gateway and the call controller are in the same subnetwork according to the subnetwork ID of the called side boundary gateway, and if so, the call controller sending the signaling request directly to the called side boundary gateway, otherwise, the call controller establishing a signaling tunnel through an intermediary boundary gateway(s) to the called side boundary gateway, and the call controller sending the signaling request through the signaling tunnel to the called side boundary gateway.

Preferably, the method further comprises: when the media gateway initiates the call, establishing a media channel from the boundary gateway connected with the media gateway to the called side boundary gateway, and transmitting the media traffic through the media channel; the step of establishing a media channel from the boundary gateway connected with the media gateway to the called side boundary gateway further comprising: the media gateway initiating the call, sending the call number to the call controller; the call controller receiving the call number and then analyzing the call number, and determining the boundary gateway connected with the media gateway and the called side boundary gateway of the call; the call controller sending a command request for establishing a media channel to the calling side boundary gateway and called side boundary gateway respectively according to the subnetwork IDs of the calling side boundary gateway and the called side boundary gateway; the call controller receiving the information of the media ports allocated and returned by the calling side boundary gateway and the called side boundary gateway respectively, and notifying the media port information to the opposite side boundary gateway respectively; the calling side boundary gateway, after receiving the media port information of the called side boundary gateway, establishing a media channel from the boundary gateway to the called side boundary gateway; the media gateway having initiated the call transmitting the media traffic through the established media channel; after the media gateway terminating the data transmission through the media channel, automatically removing the media channel.

The system and method provided by the present invention for implementing multimedia calls across a private network boundary, due to employing the boundary gateways across boundaries, the call controller for global control, and the at least one media gateway, wherein the media gateways realize the exchange of signaling messages and media traffic between different private networks or between a private network and a public network through the corresponding boundary gateway and under the control of the call controller, that is, realizing the transmission across a private network boundary while not changing the signaling content, guarantee the integrity of the IP packet payloads sent from a private network, and are applicable to the exchange of signaling messages and media traffic of different protocols between private networks or between a private network and a public network, are simple and convenient, save address resources, have wider application range, and reduce the redundant paths of data transmission.

Further, the system and method provided by the present invention for implementing multimedia calls across a private network boundary, due to being provided with the unified control of the call controller and a signaling message in the same subnetwork being formed directly into the payload of a tunnel packet without needing to be transmitted through an external network, reduce the paths of data exchange within the network, and enhance the security of data transmission.

In addition, the system and method provided by the present invention for implementing multimedia calls across a private network boundary, further due to, in an environment where a private network is nested in another private network, being able to establish a signaling tunnel or media channel from an external network such as another private network or a public network to an internal private network through multiple boundary gateways including an intermediary boundary gateway(s) under the control of the call controller, realize the data transmission in a more complex network architecture, and when having the same address translation capability, the present invention is more efficient.

To sum up, the advantages of adopting the present invention as compared with prior art are as follows:

1) By using the call controller to dynamically manage signaling tunnels and media channels, the boundary gateway resources can be saved.

2) The boundary gateway does not modify the content of the signaling message sent and received by a media gateway, not affecting the integrity of the signaling data, thus extending the application range of the boundary gateway.

3) The boundary gateway, due to not needing to modify the content of a signaling message, can no longer be concerned with what protocol a media gateway adopts, thus greatly reducing the number of boundary gateways for all the protocols in an existing scheme, lowering the difficulty of implementing a boundary gateway, and enhancing its processing efficiency and processing capability.

4) Since the boundary gateway is no longer the receiver and processor of media gateway signaling, and no longer concerned with the content of the signaling, the security and mobility of the media gateway is the same as when there is no private network, and the media gateway can move within the entire domain managed by the call controller by using the DHCP (Dynamic Host Address Configuration Protocol) technology.

5) The call controller is not responsible for routing, but rather tells the boundary gateway where the destination is, after which the boundary gateway find the path to the destination on its own, thus the call controller can focus itself on the implementation and provision of services, rather than on the establishment and maintaining of the paths, which can lower the complexity in implementing some complex services involving branches (e.g., video conferencing, Unified Message, and other services).

6) The call controller can directly manage all the media gateways, and know the network topology of the media gateways, thus for a call within the same private network in the original network, the media traffic can certainly be exchanged directly between the corresponding media gateways, without needing to be forwarded through a boundary gateway, thus enhancing the service quality.

7) The system supports complex network scenarios such as where a private network is nested within another private network.

8) The system supports the case where there are multiple boundary gateways in the same private network.

PREFERRED EMBODIMENTS OF THE INVENTION

Several typical implementations of the system will be described in detail below with reference to the drawings.

Figure 1:
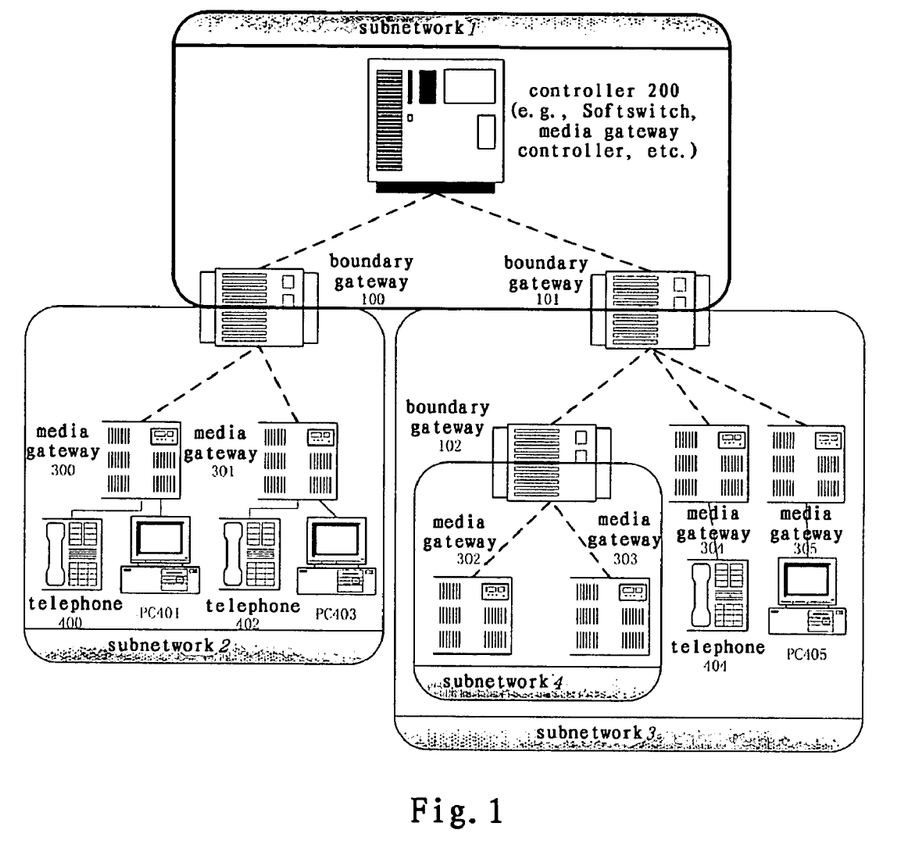
FIG. 1 shows the schematic framework of a system and method of the present invention for implementing multimedia calls across a private network boundary.

As shown in FIG. 1, the system for implementing multimedia calls across a private network boundary as described in the present invention comprises at least the following several necessary hardware components and the corresponding software code:

A) Multiple boundary gateways 100, 101, 102 (BGW), namely the protocol analysis gateways mentioned above, situated at the boundary between a private network and a public network, the primary functions of which are to perform the mapping between a private network address and a public network address, and to establish and maintain theses mapping relationships. Unlike in the prior art, the boundary gateways do not modify the signaling contents, thus guaranteeing the integrity of the signaling contents.

B) A call controller 200, such as a Softswitch mentioned above, the functions of which are to take charge of the establishment of calls and the control and implementation of service logics, and to take charge of the establishment of paths across a private network boundary.

C) Multiple media gateways 300, 301, 302, 303, possibly being or connected with media gateways or multimedia terminals etc. using various types of protocols such as H.248, MGCP, SIP, H.323, and being the access points of various multimedia services.

These component can all in the same network, which can be a IP/ATM-based transmission network, or in different networks, such as a private network and a public network, or even in an environment where a private network is nested in another private network. FIG. 1 shows a typical networking architecture of a system of the present invention. Wherein the subnetwork 1 corresponds to a public network, subnetwork 2 and subnetwork 3 correspond to private networks, while subnetwork 4 is a private network within subnetwork 3, hence the situation where a private network is nested within another private network. The media gateways 300, 301, 302, 303, 304, 305 in the subnetworks, which are connected with the multimedia terminals, such as IP telephones or PCs, e.g. the various devices denoted as 400-405 in the figure, in their own subnetworks respectively, can make multimedia calls, and transfer media traffic information such as voice, video and data etc. When crossing a private network boundary, e.g. when a multimedia terminal in the subnetwork 2 is to exchange data with an external network such as a public network (i.e. subnetwork 1), or subnetwork 3 or subnetwork 4, the boundary gateway 100 establishes on its own the path of exchanging boundary gateways under the direction of the call controller 200 and maintains it all the time.

At the same time, the boundary gateways 100, 101, 102, etc. must all be installed with the software with the corresponding functions such as routing, subnetwork determination, tunnel management, which is stored in the storage space and memory of the corresponding hardware devices. The call controller 200 should be installed with the software supporting subnetwork management, and directing a boundary gateway to maintain a tunnel, which is stored in the storage space and memory of the corresponding hardware devices. The media gateway 300, 301, . . . 305 should be installed with the software supporting the management of boundary gateways, which is stored in the storage space and memory of the corresponding hardware devices.

The core method for implementing multimedia calls across a private network boundary as described in the present invention is as follows:

In Step 1, the subnetworks where all the media gateways in the domain that the call controller 200 can control reside is numbered, and allocated an ID unique in the entire domain, such as subnetwork 1, subnetwork 2, subnetwork 3, subnetwork 4, etc. as shown in FIG. 1.

In Step 2, when the boundary gateway 100, 101, 102 is configured, it must be configured with the ID of the subnetwork where it resides, and the ID must be consistent with the corresponding subnetwork ID numbered in the call controller 200; at the same time, the boundary gateway needs to treat the call controller 200 as the signaling receiver.

In Step 3, when the media gateway 300-305 sends a signaling message to the call controller 200, the media gateway assembles the message into a normal signaling message according to the requirements of the respective protocol such as H.248, MGCP, SIP, etc, and sends it to the corresponding boundary gateway 100, 101, 102.

In Step 4, the corresponding boundary gateway, after receiving the signaling message, finds that it is a signaling message sent to the call controller, initiates a path from this boundary gateway to the call controller on its own initiative; if, according to the subnetwork ID, the boundary gateway determines that the call controller 200 is in the same subnetwork as itself, such as the boundary gateway 100, 101 and the call controller 200, it can form the signaling message directly into the payload of a tunnel packet, and sent it directly to the call controller 200; if it determines that they are not in the same subnetwork, such as the boundary gateway 102 and the call controller 200, then it establishes a tunnel from the boundary gateway 102 through the boundary gateway 101 to the call controller 200 on its own, and at this point, the boundary gateway 101, as an intermediary boundary gateway of the tunnel, forms the signaling message to be sent into the payload of a tunnel packet, and sends it to the call controller 200. In this way, the call controller 200 can receives signaling messages from different private networks through tunnels, and the original content of the signaling message sent by a media gateway is not modified. During this process, the boundary gateway is not concerned with which protocol (e.g., H.248, MGCP, SIP, etc.) the media gateway is using to send the signaling message to the call controller 200. The tunnel will remain permanently, until being reestablished for reasons such as maintenance, security, or power off.

In Step 5, the call controller 200 returns a response, which can be sent through the established tunnel to the original media gateway having sent the signaling message.

In Step 6, when the call controller 200 sends a signaling request to the other party of the call, if a tunnel has yet to be established, the call controller 200 determines whether the subnetwork where the called side media gateway resides and the subnetwork where itself resides belong to the same network, that is, whether the boundary gateway of the subnetwork where the called side media gateway resides is in the same subnetwork as the call controller; if they belong to the same network, the call controller can send the signaling message directly; if they do not belong to the same network, such as when the call controller 200 sends a command request to the media gateway 302 as shown in FIG. 1, the call controller 200 sends a request to establish a tunnel to the boundary gateway 101, and the boundary gateway 101 establishes a tunnel through the boundary gateway 102 to the media gateway 302 with an appropriate method, forms the signaling into the payload of a tunnel packet, and sends it to the media gateway 302. In this way, the signaling messages between the calling and called parties can be exchanged, and the call can be established under the direction of the call controller 200. Here, the boundary gateway 102 is at the boundary between an external private network and an internal private network in an environment where a private network is nested in another private network, hence a secondary boundary gateway.

In Step 7, for the transmission of the media traffic, unlike the signaling message for which a relatively fixed tunnel is maintained, its channel must be established dynamically upon the start of the call, and removed automatically after the call is finished, in order to save resources. Therefore, when a media tunnel needs to be established, such as establishing a media channel from the media gateway 300 to the media gateway 302, the call controller 200 sends a command request to establish a media channel to the boundary gateway 100, and instructs the boundary gateway 100 that the called party is inside the boundary gateway 102. The boundary gateway 100 automatically sends a request to establish a tunnel from the boundary gateway 100 to the called boundary gateway 102 according the instructions, and by using an appropriate method, a tunnel from the boundary gateway 100 through the boundary gateway 101 and then to boundary gateway 102 can be established, through which the media traffic can be transmitted. This tunnel, namely the media channel, will be removed automatically after the call is finished in order to save resources.

Figure 2:
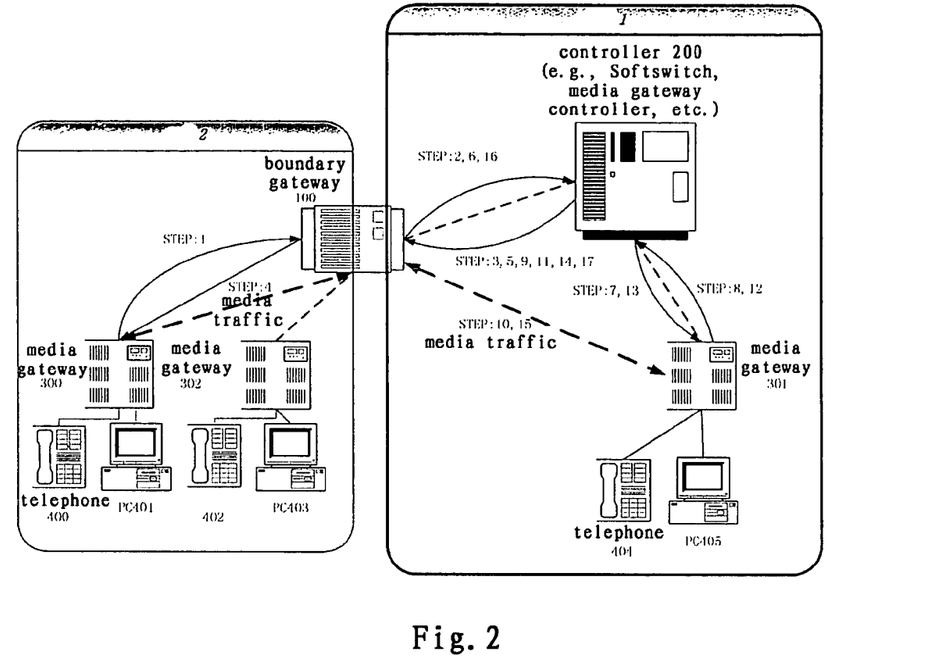
FIG. 2 shows the schematic framework of another preferred embodiment of the system and method of the present invention and the schematic flow chart of its method.

FIG. 2 illustrates another preferred embodiment of the system and method of the present invention for implementing multimedia calls across a private network boundary, showing a scenario where a user of a media gateway in a private network makes a multimedia call to a user of a media gateway in a public network, the media gateways of the calling and called parties are not in the same subnetwork, and one of the media gateways is in the same subnetwork as the call controller and boundary gateway. This is the commonest networking method, such as in the case of the intercommunication between a user of a private network and a user of a public network. In a IP/ATM network, the hardware part consists at least of the corresponding call controller 200, boundary gateway 100, media gateways 300, 301, 302, etc., and of course can further include other hardware devices such as a DHCP server, AAA server, etc.

The media gateways can use different protocols, and for ease of description, the H.248 protocol is assumed as an example, while using other protocols such as MGCP, SIP etc. do not affect the implementation of this networking method.

When a user of the media gateway 300 in the private network, such as a telephone 400 or PC 401, initiates a call, and the called user is a user of the media gateway 301 in the public network, the processing steps of the software part relating to the present invention are as follows:

In Step 1, the user of the media gateway 300 sends a message, such as a SERVICECHANGE registration or NOTIFY reporting offhook message, to the call controller 200. The media gateway 300 assembles the message, and sends it to the corresponding gateway 100. If a local end address is used as the local end ID in the signaling message, the address in the private network is used; the domain name etc. can also be used as the local end ID.

In Step 2, the boundary gateway 100, after receiving the message, finds that the call controller 200 is in the same subnetwork as the boundary gateway 100, therefore directly determines a signaling tunnel, and then encapsulates the received message directly into the tunnel packet, adds its own additional identification information, and sends the packet to the call controller 200.

In Step 3, the call controller 200, after receiving the message, extracts the original signaling message to process. After processing, the call controller 200 will return a response message such as a REPLY to the SERVICECHANGE or NOTIFY according to the H.248 protocol, which is also encapsulated into a corresponding tunnel packet, and sent to the boundary gateway 100, In Step 4, the boundary gateway 100, after receiving the message, finds internally the corresponding established tunnel, extracts the original signaling content therefrom and sends it to the media gateway 300. In this way, the media gateway 300 has been able to complete a signaling exchange with the call controller 200 through the signaling tunnel.

Thus, when the call is initiated, by repeating the Step 1 through 4, the media gateway 300 can report an offhook message to the call controller 200, receive number allocation and dial tones, wait for a number receiving message, report the received number, and create a media port etc.

In Step 5, when the call controller 200 analyzes the call number and finds that the called user is in a media gateway 301 in the same subnetwork as itself, and a media channel needs to be established, therefore it send a command to establish a media channel, which carries therein the subnetwork ID of the destination, to the boundary gateway 100.

In Step 6, if the boundary gateway 100, after receiving the message, determines that the called media gateway 301 is in the same subnetwork as itself, it allocates a media port in itself, and returns it to the call controller 200.

In Step 7, the call controller 200 sends the media port returned by the boundary gateway 100 to the called side media gateway 301 as a remote port in the H.248 protocol, requesting ringing and establishing a media port.

In Step 8, the called side media gateway 301, after receiving the message, due to its being a standard signaling, processes it properly according to the protocol, perform ringing, and returns the created media port to the call controller 200.

In Step 9, the call controller 200 receives the media capability of the called side, and sends a command to confirm the path to the boundary gateway 100.

In Step 10, the boundary gateway 100, after receiving the command, due to having knowledge the media port of the called side, can establish a connection from itself to the called side media port and keep it, as a forwarding point for the media traffic.

In Step 11, the call controller 200 sends the capability of the called side to the calling side media gateway 300 according to the H.248 protocol, wherein the capability of the called side has been replaced with the media port allocated by the boundary gateway 100. In this way, through the forwarding of the boundary gateway 100, media traffic of the media gateway 300 and the media gateway 301 can be transferred with each other.

In Step 12, when the call is finished, the called user reports a hang up message to the media gateway 301.

In Step 13, the call controller 200, after receiving the hang up message, returns an acknowledgement message to the media gateway 301 according to the requirements of the protocol H.248.

In Step 14, at the same time, the call controller 200 sends a command to release the media connection to the boundary gateway 100.

In Step 15, the boundary gateway 100 receives the command, and releases the established connection; but the signaling tunnel of the media gateway 300 still remains.

In Step 16, the boundary gateway 100 may returns the corresponding statistics to the call controller 200.

In Step 17, the call controller 200 sends a busy tone to the calling side through the signaling tunnel according to the protocol, and waits for the hang up to complete the work of releasing the call. Wherein, the signaling exchange can repeat the operations of Step 1 through 4.

Figure 3:
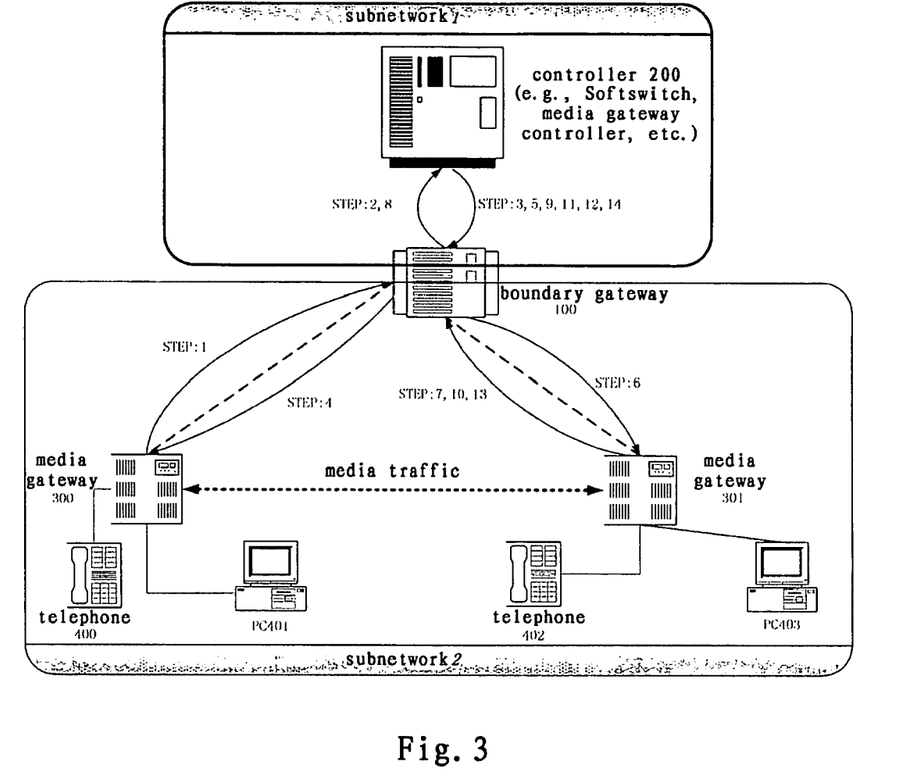
FIG. 3 shows a schematic framework of a third preferred embodiment of the system and method of the present invention and the schematic flow chart of its method.

FIG. 3 illustrates a third preferred embodiment of the system and method of the present invention for implementing multimedia calls across a private network boundary, showing a scenario where a multimedia call is made between the users of two media gateways in the same private network, which is generally applied to calls within the same private network (e.g. the same company). The hardware components are the same as in the two previous embodiments, and will not be repeated here.

The media gateways can use various protocols, and for ease of the description, the H.248 protocol is assumed as an example, while using other protocols such as MGCP, SIP, etc. will not affect the implementation of this networking method.

When a user of the media gateway 300, such as an IP telephone 400 or a multimedia terminal PC 401, initiates a call, and the called user is a user of another media gateway 301 of the same subnetwork, such as an IP telephone 402 or a multimedia terminal PC 403, the processing steps of the software part relating to the system are as follows:

In Step 1, the user in the media gateway 300 sends a message, such as a SERVICECHANGE registration or NOTIFY reporting offhook message, to the call controller 200. The media gateway 300 assembles the message, and sends it to the corresponding boundary gateway 100. If an address of the local end is used as the local end ID in the signaling message, the address in the private network is used; the domain name etc. can also be used as the local end ID.

In Step 2, the boundary gateway 100, after receiving the message, finds that the call controller is in the same subnetwork with the boundary gateway 100, therefore directly determines a signaling tunnel, and then encapsulates the received message into a tunnel packet, adds its own additional identification information, and sends the packet to the call controller 200.

In Step 3, the call controller 200, after receiving the message, extracts therefrom the original signaling message to process; after processing, the call controller 200 will returns a response message such as a REPLY to the SERVICECHANGE or NOTIFY according to the H.248 protocol, which is also encapsulated into the corresponding tunnel packet and sent to the boundary gateway 100.

In Step 4, the boundary gateway 100, after receiving the message, finds internally the corresponding established tunnel, extracts the original signaling content therefrom, and sends it to the corresponding media gateway 300. In this way, the media gateway 300 has been able to complete a signaling exchange with the call controller 200 through a signaling tunnel.

Thus, when the call is initiated, by repeating the previous Step 1 though 4, the media gateway 300 can report the offhook message to the call controller 200, receive number allocation and dial tones, wait for a number receiving message, report the received number, and create a media port, etc.

In Step 5, when the call controller 200 analyzes the call number and finds that the called user is in the media gateway 301 in the same subnetwork as itself, it determines that it is unnecessary to establish a media channel, but it is necessary to establish a signaling tunnel. So it directly treats the media port returned by the boundary gateway 100 as a remote port in the H.248 protocol, requesting ringing and establishing a media port, encapsulates the message into the payload of a tunnel packet, and then sends the packet to the boundary gateway 100.

In Step 6, the boundary gateway 100, after receiving the message, looks up the internal records, finds the signaling tunnel established when the called side media gateway registered, extracts the original signaling from the message, and sends it to the called side media gateway 301.

In Step 7, the called side media gateway 301, after receiving the message, due to its being a standard signaling, processes it appropriately according to the protocol, perform ringing, and returns the created media port.

In Step 8, the boundary gateway 100, after receiving the response returned from the called side media gateway 301, finds internally the signaling tunnel, encapsulates the message into a tunnel packet, and sends the packet to the call controller 200.

In Step 9, the call controller 200, after receiving the response, repeats the Step 5 through 8 to send the capability of the called side to the calling side media gateway 300 according to the H.248 protocol, wherein the called side capability is still the media port allocated by the called side gateway 301. In this way, the media traffic of the media gateway 300 and the media gateway 301 can be transferred directly between each other, and not through the forwarding of the boundary gateway 100.

In Step 10, after the call is finished, the called user reports a hang up message to the media gateway 301, and by repeating Step 1 through 4, the call controller 200 can receives the hang up message.

In Step 11, the call controller 200, after receiving the hang up message, returns an acknowledgement message to the media gateway 301 according to the H.248 protocol.

In Step 12, at the same time, the call controller 200 repeats Step 5 through 8 to sends a command to release the call to the media gateway 301.

In Step 13, the called side media gateway 301 may return the corresponding statistics to the call controller 200.

In Step 14, the call controller 200 sends a busy tone to the calling side through the signaling tunnel according to the protocol, and waits for the hang up to complete the work of releasing the call. Wherein, the signaling exchange can repeats Step 1 through 8.

Figure 4:
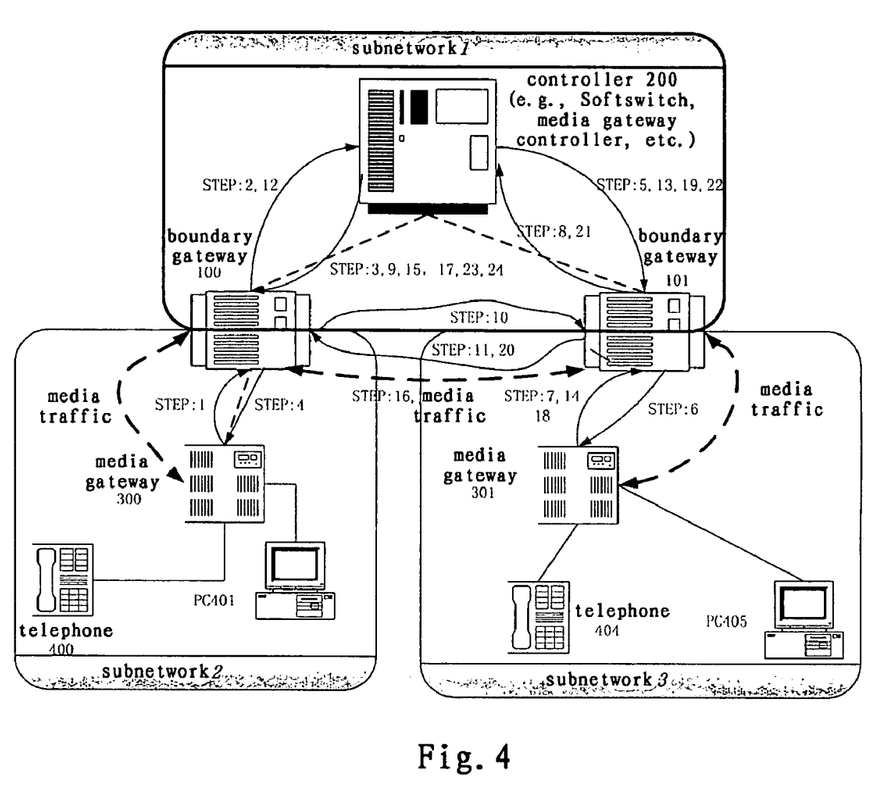
FIG. 4 shows a schematic framework of a fourth preferred embodiment of the system and method of the present invention and the schematic flow chart of its method.

FIG. 4 illustrates a fourth preferred embodiment of the system and method of the present invention for implementing multimedia calls across a private network boundary, showing the scenario where a multimedia call is made between the users of media gateways of two private networks. The hardware components are the same as in the previous embodiments and will not be repeated.

The media gateways can use various protocols, and for ease of the description, the H.248 protocol is assumed as an example, while using other protocols such as MGCP, SIP, etc. will not affect the implementation of this networking method.

When a user of the media gateway 300 in the private network initiates a call, and the called user is the user of the media gateway 301 in another private network, the processing steps of the software part relating to the system are as follows:

In Step 1, the user in the media gateway 300 sends a message, such as a SERVICECHANGE registration or NOTIFY reporting offhook message, to the call controller 200. The media gateway 300 assembles the message, and sends it to the corresponding boundary gateway 100. If an address of the local end is used as the local end ID in the signaling message, the address in the private network is used; the domain name etc. can also be used as the local end ID.

In Step 2, the boundary gateway 100, after receiving the message, finds that the call controller is in the same subnetwork as the boundary gateway 100, therefore directly determines a signaling tunnel, and then directly encapsulates the received message into a tunnel packet, adds its own additional identification information, and sends the packet to the call controller 200.

In Step 3, the call controller 200, after receiving the message, extracts therefrom the original signaling message to process. After the processing, the call controller 200 will returns a response message such as a REPLY to the SER- VICECHANGE or NOTIFY according to the H.248 protocol, which is also encapsulated into the corresponding tunnel packet and sent to the boundary gateway 100.

In Step 4, the boundary gateway 100, after receiving the message, finds internally the corresponding established tunnel, extracts the original signaling content therefrom, and sends it to the corresponding media gateway 300. In this way, the media gateway 300 has been able to complete a signaling exchange with the call controller 200 through the signaling tunnel.

The media gateway 301 will also send a corresponding message to the call controller 200, and by repeating Step 1 through 4, establish in the corresponding gateway 101 a signaling tunnel from the called controller 200 to the media gateway 302.

In Step 5, when the call controller 200 sends a message such as number allocation and dial tones to the media gateway 300 according to the H.248 protocol, it assembles the corresponding command content, such as ADD or MODIFY, etc., encapsulates it into the corresponding tunnel packet, and sends it to the boundary gateway 100.

In Step 6, the boundary gateway 100, after receiving the message, finds internally the established tunnel, extracts the original signaling content therefrom, and sends it to the media gateway 300.

In Step 7, the media gateway 300 performs an action according to the command content, and returns the performance result according to the protocol.

In Step 8, the boundary gateway 100, after receiving the returned result, returns it to the call controller 200 through the tunnel. In this way, the signaling between the media gateway 300 and the call controller 200 can be exchanged through the boundary gateway 100. In the same way, the signaling between the media gateway 301 and the call controller 200 can be exchanged through the boundary gateway 101.

Thus, when the call is initiated, by repeating the previous Step 1 through 8, the media gateway 300 can report the offhook message to the call controller 200, receive number allocation and dial tones, wait for a number receiving message, report the received number, and create a media port, etc.

In Step 9, when the call controller 200 analyzes the number, and finds that the called user is in a subnetwork different from the calling user, it searches out the boundary gateway 101 where it resides. Then, the call controller 200 sends a command to establish a media connection to the boundary gateway 100.

In Step 10, the boundary gateway 100, after receiving the message, determines that the called media gateway 301 is not in the same subnetwork as itself, and sends a request to establish a media channel to the called side boundary gateway 101.

In Step 11, if the boundary gateway 101 can establish the tunnel, it returns the established tunnel parameters to the calling side boundary gateway 100.

In Step 12, the boundary gateway 100 returns its own media port and the media port obtained from the boundary gateway 101 to the call controller 200.

In Step 13, the call controller 200 treats the media port of the called boundary gateway 101 in the parameters returned by the boundary gateway 100 as a remote port in the H.248 protocol, and by repeating the Step 5 through 8, sends it to the media gateway 301, requesting ringing and establishing a media port.

In Step 14, the called side media gateway 301, after receiving the message, due to its being a standard signaling, processes it appropriately according to the protocol, performs ringing, and repeats Step 7 through 8 to return the created media port to the call controller 200.

In Step 15, the call controller 200 receives the media capability of the called side, and sends a command to confirm the path to the calling boundary gateway 100.

In Step 16, the boundary gateway 100, after receiving the command, due to its having known the media port of the called side, can establish a tunnel from itself to the called side media port and keep it, as a forwarding point for the media traffic.

In Step 17, the call controller 200 sends the capability of the called side to the calling side media gateway 300 according to the H.248 protocol, wherein the called side capability has been replaced with the media port allocated by the calling side boundary gateway 100. In this way, through the forwarding of the boundary gateway 100 and the called side boundary gateway 101, the media traffic of the calling side media gateway 300 and the called side media gateway 301 can be transferred with each other.

In Step 18, when the call is finished, the called user reports a hang up message to the called side media gateway 301, which in turn reports the message to the call controller as in Step 1 through 4.

In Step 19, the call controller 200, after receiving the hang up message, sends a command to release the media tunnel to the called side boundary gateway 101.

In Step 20, the called side boundary gateway 101 receives the command, and releases the established media tunnel. But the signaling tunnel of the media gateway 301 still remains.

In Step 21, the called side boundary gateway 101 may return the corresponding statistics to the call controller 200.

In Step 22, at the same time, the call controller 200 also repeats Step 5 through 8 to send a command to release the call to the called side media gateway 301 according to the protocol.

In Step 23, the call controller 200 also sends a command to release the media tunnel to the calling side boundary gateway 100. The operations are similar to those of Step 19 through 21.

In Step 24, the call controller 200 sends a busy tone to the calling side through the signaling tunnel according to the protocol, and waits for the hang up to complete the work of releasing the call. Wherein, the signaling exchange can repeat Step 1 to Step 8.

To sum up, the advantages of adopting the present invention as compared with the prior art are as follows:

1. By the call controllers dynamically managing signaling information tunnels and media channels, the boundary gateway resources can be saved.

2. The boundary gateways do not modify the content of the signaling messages sent and received by media gateways, not affecting the integrity of the signaling data, thus extending the application range of the boundary gateways.

3. Since the boundary gateways do not need to modify the content of the signaling messages, they are no longer concerned with what protocols the media gateways are using, therefore the number of boundary gateways for all the protocols in the existing schemes are greatly reduced, the difficulty of implementing the boundary gateways is lowered, and their processing efficiency and processing capability are enhanced.

4. Since the boundary gateways are no longer the receivers and processors of the signaling of the media gateways, and no longer concerned with the signaling contents, the security and mobility of the media gateways are the same as when there is no private network, and the media gateways can move in the entire domain managed by the call controller by using the DHCP protocol or another technique.

5. The call controller is not responsible for routing, but rather tells the boundary gateway where the destination is located, after which the boundary gateway finds the path to the destination on its own, therefore the call controller can focus itself on the implementation and provision of services, rather than on the establishment and maintenance of the paths, which can lower the implementation complexity in implementing some complex services involving branches (e.g., video conferencing, United Message, etc.).

6. The call controller can directly manage all the media gateways, and know the network topology of the media gateways, therefore for a call in the same private network in the original network, the media traffic can be directly exchanged between the corresponding media gateways, without needing to be forwarded through a boundary gateway, thus enhancing the service quality.

7. The system supports complex network scenarios such as a private network being nested in another private network.

8. The system supports the case where there are multiple boundary gateways in the same private network.

It should be pointed out that those skilled in the art can make various possible equivalent alterations or substitutions based on the description of the technical solutions and their embodiments of the present invention, and all of these alterations and substitutions should belong to the protection scope as defined in the appended claims of the present invention.

The invention claimed is:

1. A system for implementing multimedia calls across a private network boundary, comprising a public network and at least one private network, characterized in that the system comprises:
    at least one media gateway for connecting with multimedia terminals of various protocols;
    at least one boundary gateway for connecting the private network and the public network, and performing the translation of a private network address and a public network address, wherein each boundary gateway is provided with a unique subnetwork ID to correspond to the private network connected therewith; and the boundary gateway is used for receiving the signaling message from a media gateway connected therewith, establishing a signaling tunnel from the boundary gateway to the call controller according to its own subnetwork ID, and sending the signaling message to the call controller through the signaling tunnel;
    a call controller for establishing calls and controlling service logics, in which is recorded the correspondence relationship information of all said boundary gateways and the subnetwork IDs;
    wherein the call controller processes the call concerning a private network according to the subnetwork ID information, and wherein
        the media gateway initiates the call and sends the call number to the call controller
        the call controller, after receiving the call number, analyzes the call number, and determines the boundary gateway connected with the media gateway and the called side boundary gateway,
        the call controller sends a command request to establish a media channel to the calling side boundary gateway and the called side boundary gateway respectively according to the subnetwork IDs of the calling side boundary gateway and the called side boundary gateway,
        the call controller receives the information of the media ports allocated and returned by the calling side boundary gateway and the called side boundary gateway respectively, and notifies the information of the media ports to the opposite side boundary gateways respectively,
        the calling side boundary gateway, after receiving the notification of the media port information of the called side boundary gateway, establishes a media channel from the boundary gateway to the called side boundary gateway,
        the media gateway having initiated the call transmits the media traffic through the established media channel, and
        after the media gateway finishes transmitting the media traffic in the media channel, removes the media channel automatically.

2. The system according to claim 1, characterized in that the media gateway, as an access point of multimedia services for the multimedia terminals connected therewith, assembles the signaling information of the multimedia terminals to the call controller into the standard signaling information according to the respective protocol, but not changing the content of the signaling message, and sends it to the boundary gateway connected with the media gateway.

3. The system according to claim 1, characterized in that the boundary gateway is further used for automatically establishing, when the media gateway initiates the call, a media channel to the called side boundary gateway according to the subnetwork ID of the called side boundary gateway, to transmit the media traffic.

4. The system according to claim 1, characterized in that the call controller receives the signaling message from the boundary gateway, returns a response message to the media gateway having sent the signaling message according to the subnetwork ID of the boundary gateway, establishes a signaling tunnel to the called side boundary gateway according to the subnetwork ID of the called side boundary gateway, and when the call is initiated, controls the establishment of a media channel according to the subnetwork IDs of the calling side boundary gateway and the called side boundary gateway.

5. The system according to claim 1, characterized in that the private network of the system can further have private networks nested within.

6. The system according to claim 5, characterized in that the system further comprises internal boundary gateways for connecting said private network and the nested private networks of said private network, wherein each of the internal boundary gateways is provided with an unique subnetwork ID to correspond to the private network connected therewith.

7. The system according to claim 6, characterized in that the internal boundary gateway receives the signaling message from the media gateway connected therewith, establishes a signaling tunnel from the boundary gateway through an intermediary boundary gateway(s) to the call controller according to its own subnetwork ID, sends the signaling message through the signaling tunnel to the call controller, and when the media gateway initiates the call, automatically establishes a media channel through the intermediary boundary gateway(s) to the called side boundary gateway according to the subnetwork ID of the called side boundary gateway, to transmit the media traffic.

8. The system according to claim 1 or 6, characterized in that each private network is provided with a unique subnetwork ID.

9. The system according to claim 8, characterized in that the subnetwork ID of each boundary gateway is consistent with the subnetwork ID of the private network to which it belongs.

10. The system according to claim 8, characterized in that the subnetwork ID of each internal boundary gateway is consistent with the subnetwork ID of the private network to which it belongs.

11. A method for implementing multimedia calls in a system containing a public network and private networks, the system comprising:
   at least one media gateway for connecting with multimedia terminals of various protocols;
   at least one boundary gateway for connecting the private networks and the public network, and performing the translation between a private network address and a public network address;
   a call controller for establishing calls and controlling service logics, in which is recorded the correspondence relationship information of all said boundary gateways and the subnetwork IDs;
   characterized in that the method comprises:
   providing each boundary gateway with a unique subnetwork ID to correspond to the private network connected therewith; and
   processing a multimedia call according to the subnetwork ID of the boundary gateway, which comprises:
   the media gateway sending the signaling message of a multimedia terminal to the call controller to the boundary gateway connected with the media gateway;
   the boundary gateway, after receiving the signaling message, establishing a signaling tunnel from the boundary gateway to the call controller according to its own subnetwork ID, and sending the signaling message through the signaling tunnel to the call controller;
   the media gateway initiating the call, sending the call number to the call controller;
   the call controller, after receiving the call number, analyzing the call number, and determining the boundary gateway connected with the media gateway and the called side boundary gateway;
   the call controller sending a command request to establish a media channel to the calling side boundary gateway and the called side boundary gateway respectively according to the subnetwork IDs of the calling side boundary gateway and the called side boundary gateway;
   the call controller receiving the information of the media ports allocated and returned by the calling side boundary gateway and the called side boundary gateway respectively, and notifying the information of the media ports to the opposite side boundary gateways respectively;
   the calling side boundary gateway, after receiving the notification of the media port information of the called side boundary gateway, establishing a media channel from the boundary gateway to the called side boundary gateway;
   the media gateway having initiated the call transmitting the media traffic through the established media channel; and
   after the media gateway finishes transmitting the media traffic in the media channel, removing the media channel automatically.

12. The method according to claim 11, characterized in that, the step of providing each boundary gateway with a unique subnetwork ID further comprises:
   numbering the subnetworks where all the media gateways in the domain that the call controller can control reside, and allocating a subnetwork ID unique in the entire domain to each of them; and
   providing each of the boundary gateways with an unique subnetwork ID, the subnetwork ID of the boundary gateway being consistent with the subnetwork ID of the subnetwork connected therewith, and treating the call controller as the signaling receiver of the boundary gateway.

13. The method according to claim 11, characterized in that the step of processing a multimedia call according to the subnetwork ID of the boundary gateway further comprises:
   the call controller receiving the signaling message from the boundary gateway, and returning a response message to the media gateway having sent the signaling message according to the subnetwork ID of the boundary gateway.

14. The method according to claim 13, characterized in that the step of the media gateway sending the signaling message to the boundary gateway further comprises:
   the media gateway assembling the signaling message into a standard message according to the requirements of the respective protocol, and then sending it to the boundary gateway connected with the media gateway.

15. The method according to claim 13, characterized in that the step of establishing a signaling tunnel from the boundary gateway to the call controller further comprises:
   the boundary gateway determining whether the boundary gateway and the call controller is in the same subnetwork according to the subnetwork ID, and if so, the boundary gateway sending the signaling message directly to the call controller, otherwise, the boundary gateway establishing a signaling tunnel from an intermediary boundary gateway(s) to the call controller, and the boundary gateway sending the signaling message through the signaling tunnel to the call controller.

16. The method according to claim 13 or 15, characterized in that the signaling tunnel, after being established, will remain permanently and be maintained all the time by the boundary gateway for the subsequent signaling exchanges between the connected media gateways and the call controller.

17. The method according to claim 13, characterized in that, the method further comprises:
   when the media gateway initiates the call, establishing a signaling tunnel from the call controller to the called side boundary gateway.

18. The method according to claim 17, characterized in that the step of establishing a signaling tunnel from the call controller to the called side boundary gateway further comprises:
   the media gateway initiating the call, sending the call number to the call controller;
   the call controller, after receiving the call number, analyzing the call number, and sending a signaling request to the called side boundary gateway; and
   the call controller determining whether the called side boundary gateway and the call controller is in the same subnetwork according to the subnetwork ID of the called side boundary gateway, and if so, the call controller sending the signaling request directly to the called side boundary gateway, otherwise, the call controller establishing a signaling tunnel through an intermediary boundary gateway(s) to the called side boundary gateway, and the call controller sending the signaling request through the signaling tunnel to the called side boundary gateway.

19. The method according to claim 13, characterized in that the method further comprises:
   when the media gateway initiating the call, establishing a media channel from the boundary gateway connected with the media gateway to the called side boundary gateway, and transferring the media traffic through the media channel.

* * * * *